United States Patent
Patel et al.

(10) Patent No.: US 7,073,715 B2
(45) Date of Patent: Jul. 11, 2006

(54) INTERFACE FOR INTERFACING AN IMAGING ENGINE TO AN OPTICAL CODE READER

(75) Inventors: Mehul Patel, Fort Salonga, NY (US); Tsi David Shi, Stony Brook, NY (US); Thomas Bianculli, Manorville, NY (US); Joseph Giordano, Bayville, NY (US); Eduard Kogan, Howard Beach, NY (US); Heng Zhang, Holbrook, NY (US); Nicholas Buongervino, Hauppauge, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 69 days.

(21) Appl. No.: 10/459,935

(22) Filed: Jun. 12, 2003

(65) Prior Publication Data
US 2004/0159705 A1    Aug. 19, 2004

Related U.S. Application Data (60) Provisional application No. 60/460,370, filed on Apr. 4, 2003, provisional application No. 60/447,093, filed on Feb. 13, 2003.

(51) Int. Cl.
*G06K 7/10*    (2006.01)
(52) U.S. Cl. ............ 235/462.25; 265/462.37; 265/462.11; 265/462.15; 265/462.22; 265/462.23; 265/462.24; 265/472.01; 250/350

(58) Field of Classification Search ........... 235/462.37, 235/462.11, 462.15, 472.01, 462.22–462.26; 250/350
See application file for complete search history.

(56) References Cited

U.S. PATENT DOCUMENTS

| 4,251,798 A | 2/1981 | Swartz et al. |
| 5,117,137 A | 5/1992 | Kobayashi |

(Continued)

FOREIGN PATENT DOCUMENTS

| WO | WO 01/29836 A | 4/2001 |

(Continued)

*Primary Examiner*—Karl D. Frech
*Assistant Examiner*—Allyson N Trail
(74) *Attorney, Agent, or Firm*—Carter, DeLuca, Farrell & Schmidt, LLP

(57) ABSTRACT

An interface assembly is provided for interfacing an imaging engine having an adjustable lens assembly to a circuitry assembly of an optical code reader system, the interface assembly includes a first coupling circuitry assembly for transmission of at least one input signal in a first direction from the circuitry assembly toward the imaging engine, the at least one input signal including at least one focus control signal for controlling the lens assembly for selecting a focus position of at least two focus positions, and a second coupling circuitry assembly for transmission of at least one output signal in a second direction from the imaging engine toward the circuitry assembly, the at least one output signal including at least one pixel data signal, wherein the at least one pixel data signal is indicative of light sensed by a photo sensor array of the imaging engine. Preferably, the imaging engine is removably positioned and/or dimensioned and configured to fit within a predetermined form factor.

29 Claims, 6 Drawing Sheets

U.S. PATENT DOCUMENTS

| | | |
|---|---|---|
| 5,198,648 A | 3/1993 | Hibbard |
| 5,561,283 A | 10/1996 | Dvorkis et al. |
| 5,796,089 A | 8/1998 | Marom |
| 5,965,890 A * | 10/1999 | Hanson ................ 250/350 |
| 6,340,114 B1 | 1/2002 | Correa et al. |
| 2004/0118925 A1 * | 6/2004 | Kelly et al. ............ 235/462.15 |
| 2004/0118927 A1 * | 6/2004 | Breytman et al. ..... 235/462.37 |
| 2004/0118928 A1 * | 6/2004 | Patel et al. ............ 235/472.01 |
| 2004/0211836 A1 * | 10/2004 | Patel et al. ............ 235/462.11 |

FOREIGN PATENT DOCUMENTS

WO     WO 02/44790 A     6/2002

* cited by examiner

| PIN NUMBER | SIGNAL NAME | I/O | COMMENTS |
|---|---|---|---|
| 1 | GND | PWR | GROUND |
| 2 | PCLK | O | PIXEL CLOCK |
| 3 | GND | PWR | GROUND |
| 4 | HREF | O | HORIZONTAL PIXEL VALID CLOCK (SYNC) |
| 5 | VCC_MOTOR | PWR | FOCUS CONTROL MOTOR POWER |
| 6 | VCC_ILLUM | PWR | ILLUMINATION POWER |
| 7 | REG_RESET* | I/O | I2C REGISTER RESET |
| 8 | VCC | PWR | CCD/AIMING POWER |
| 9 | VCC | PWR | CCD/AIMING POWER |
| 10 | EXSFT | I | EXTERNAL FRAME SYNC. |
| 11 | ILLUM_ENB* | I | ILLUMINATION POWER |
| 12 | AIM_ENB* | I | AIM ENABLE |
| 13 | PIX_D0 | O | PIXEL DATA BIT 0 |
| 14 | PIX_D1 | O | PIXEL DATA BIT 1 |
| 15 | PIX_D2 | O | PIXEL DATA BIT 2 |
| 16 | PIX_D3 | O | PIXEL DATA BIT 3 |
| 17 | PIX_D4 | O | PIXEL DATA BIT 4 |
| 18 | PIX_D5 | O | PIXEL DATA BIT 5 |
| 19 | PIX_D6 | O | PIXEL DATA BIT 6 |
| 20 | PIX_D7 | O | PIXEL DATA BIT 7 |
| 21 | FOCUS_CTRL1 | I | FOCUS CONTROL LINE 1 |
| 22 | VREF | O | VERTICAL FRAME VALID CLOCK (SYNC) |
| 23 | EXHT | I | EXTERNAL HORIZONTAL CLOCK |
| 24 | I2C_SDA | I/O | I2C DATA |
| 25 | I2C_SCL | I | I2C CLOCK |
| 26 | GND | PWR | GROUND |
| 27 | MCKI | I | MASTER CLOCK |
| 28 | GND | PWR | GROUND |
| 29 | FOCUS_CTRL2 | I | FOCUS CONTROL LINE 2 |
| 30 | CS* | I | CHIP SELECT |
| 31 | FRAME_SHIFT | O | FRAME SHIFT AFTER EXPOSURE FOR MODE 1 |

INTERFACE FOR INTERFACING AN IMAGING ENGINE TO AN OPTICAL CODE READER

PRIORITY

This application claims priority from two U.S. Provisional Applications filed on Feb. 13, 2003 and Apr. 4, 2003 and assigned U.S. Provisional Application Ser. Nos. 60/447,093 and 60/460,370, the entire contents of both provisional applications are incorporated herein by reference.

BACKGROUND OF THE INVENTION

1. Field of the Invention

This invention relates to imaging in optical code reading devices. Aspects of the invention are particularly useful in solid state, area image sensor based, handheld code readers which are positioned at variable orientations and distances with respect to a target code.

2. Description of the Related Art

Optical codes are patterns made up of image areas having different light reflective or light emissive properties, which are typically assembled in accordance with a priori rules. The term "barcode" is typically used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type.

Optical code readers are used in both fixed and portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. Another conventional optical code is known as "MaxiCode". It consists of a central finder pattern or bull's eye center and a grid of hexagons surrounding the central finder.

It is noted that the aspects of the inventions disclosed herein are applicable to optical code readers, in general, without regard to the particular type of optical codes which they are adapted to read. The invention described may also be applicable to some associated image recognition or analysis.

Most conventional scanning systems generate one or more beams of laser light which reflects off a barcode symbol and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two dimensional barcodes is disclosed in U.S. Pat. No. 5,561,283, also assigned to Symbol Technologies, Inc.

Such scanning systems are deployed in handheld units which may be manually pointed at the target. Often an individual scanner is a component of a much larger system including other scanners, computers, cabling, data terminals, etc. Such systems are frequently designed and constructed on the basis of mechanical and optical specifications for the scanning engine, sometimes called "form factors". One such form factor is the SE1200 form factor designed by Symbol Technologies, Inc.

Optical codes can also be read by employing optical code readers having an imaging engine. An imaging engine includes an image sensor having a two-dimensional array of cells or photo sensors, such as an area charge coupled device (CCD), which correspond to image elements or pixels in a field of view of the imaging engine. The imaging engine further includes a lens assembly for focusing light incident on the image sensor and associated circuitry coupled to the image sensor.

The associated circuitry produces electronic signals corresponding to a two-dimensional array of pixel information for the field of view. The electrical signals are processed by a processor for extracting information indicative of the focus quality of an image corresponding to the field of view.

An object of the present invention is to provide a more versatile optical code reader than prior art optical code readers.

Another object of the present invention is to provide an imaging engine having a specific interface for an optical code reading device.

Another object of the present invention is to provide an imaging engine having a specific interface, where the imaging engine is dimensioned and configured to fit within a predetermined form factor, such as the SE900 and SE1200 form factors which are utilized in currently deployed optical code readers, such as optical code readers available from Symbol Technologies, Inc., to increase the reliability, versatility and focusing ability of such readers.

SUMMARY OF THE INVENTION

In accordance with the present invention, an interface assembly is provided for interfacing an imaging engine having an adjustable lens assembly to a circuitry assembly of an optical code reader system. The interface assembly includes a first coupling circuitry assembly for transmission of at least one input signal in a first direction from the circuitry assembly toward the imaging engine, the at least one input signal including at least one focus control signal for controlling the lens assembly for selecting a focus position of at least two focus positions. The interface assembly further includes a second coupling circuitry assembly for transmission of at least one output signal in a second direction from the imaging engine toward the circuitry assembly, the at least one output signal including at least one pixel data signal, wherein the at least one pixel data signal is indicative of light sensed by a photo sensor array of the imaging engine.

In another embodiment of the invention, the interface assembly includes interface assembly including coupling circuitry including first coupling circuitry for transmitting at least one external vertical frame clock signal in a first direction from the circuitry assembly toward the imaging engine; second coupling circuitry for transmitting at least one horizontal pixel valid clock signal in a second direction from the imaging engine toward the circuitry assembly; third coupling circuitry for transmitting in the first direction at least one master clock signal; fourth coupling circuitry for transmitting in the second direction a plurality of bits of pixel data indicative of light sensed by a photo sensor array of the imaging engine; and fifth coupling circuitry for transmitting in the first direction at least one focus control signal for controlling the lens assembly for selecting the focus position.

In another embodiment of the invention, the interface assembly includes a connector having at least a first and second end, one of the of the first and second ends including a plurality of contacts including a first through a thirty-first contact for transmitting at least one signal. The interface assembly further includes first coupling circuitry for transmitting at least one focus control signal in a first direction from the circuitry assembly toward the imaging engine for controlling the lens assembly for selecting a focus position of at least two focus positions of the lens assembly, the first coupling circuitry including four contacts of the plurality of contacts; second coupling circuitry for transmitting at least one of at least one illumination enable signal in the first direction for controlling an illumination assembly of the optical code reader system and at least one aim enable signal in the first direction for controlling an aiming assembly of the optical code reader system, the second coupling including at least two of the contacts of the plurality of contacts; and third coupling circuitry for transmitting a plurality of bits of pixel data indicative of light sensed by a photo sensor array of the imaging engine in a second direction from the imaging engine toward the circuitry assembly, the third coupling circuitry including eight contacts of the plurality of contacts; wherein each of the contacts included in the first through the third coupling circuitry are different contacts.

In another embodiment of the invention, the interface assembly includes at least one of an input/output (I/O) means of the imaging engine, an I/O means of the circuit assembly, and a transmission assembly connected between the imaging engine and the circuitry assembly configured for transmitting at least one signal from one of the imaging engine and the circuitry assembly toward the other of the imaging engine and the circuitry assembly. The at least one signal includes at least one pixel data signal indicative of light sensed by a photo sensor array of the imaging engine; at least one clock signal for synchronization of the imaging engine and circuitry assembly; at least one reference signal including at least one vertical frame reference signal and at least one horizontal pixel reference signal; and at least one focus control signal for controlling adjustment of the lens assembly; and at least one ground signal.

In another embodiment of the present invention, a method is provided for interfacing an imaging engine removably positioned within an optical code reader to a circuitry assembly of an optical code reader system. The method includes the steps of transmitting at least one focus control signal in a first direction from the circuitry assembly toward the imaging engine for controlling a lens assembly of the imaging engine for selecting a focus position of at least two focus positions, and transmitting at least one pixel data signal indicative of light sensed by a photo sensor array of the imaging engine in a second direction from the imaging engine toward the circuitry assembly.

The imaging engine is preferably dimensioned and configured to be removably positioned and fit within a predetermined form factor, such as the SE900 and SE1200 form factors which are utilized in optical code readers, such as optical code readers available from Symbol Technologies, Inc., to increase the reliability, versatility and focusing ability of such readers Preferably, the imaging engine is optimized to provide high resolution images by having a high resolution photo detector array or image sensor. The imaging engine may be provided with an aiming and/or illumination assembly as known in the art.

Further, the imaging engine is preferably capable of automatically focusing an image impinged on the image sensor by adjusting the position of at least one lens of a lens assembly of the imaging engine. It is contemplated, however, that the imaging engine is a fixed-focus-type imaging engine.

It is provided that the imaging engine having the interface characterized by the particular specifications in accordance with the present invention can be incorporated within or added to devices other than optical code readers, such as personal digital assistants (PDAs) and other mobile computing devices, a digital camera, a pager, a video telephone, and a cellular telephone. Accordingly, the above and other embodiments of the invention will be described herein below with reference to the accompanying figures.

BRIEF DESCRIPTION OF THE DRAWINGS

Various embodiments of the invention will be described herein below with reference to the figures wherein.

DETAILED DESCRIPTION OF THE PREFERRED EMBODIMENTS

Figure 1:
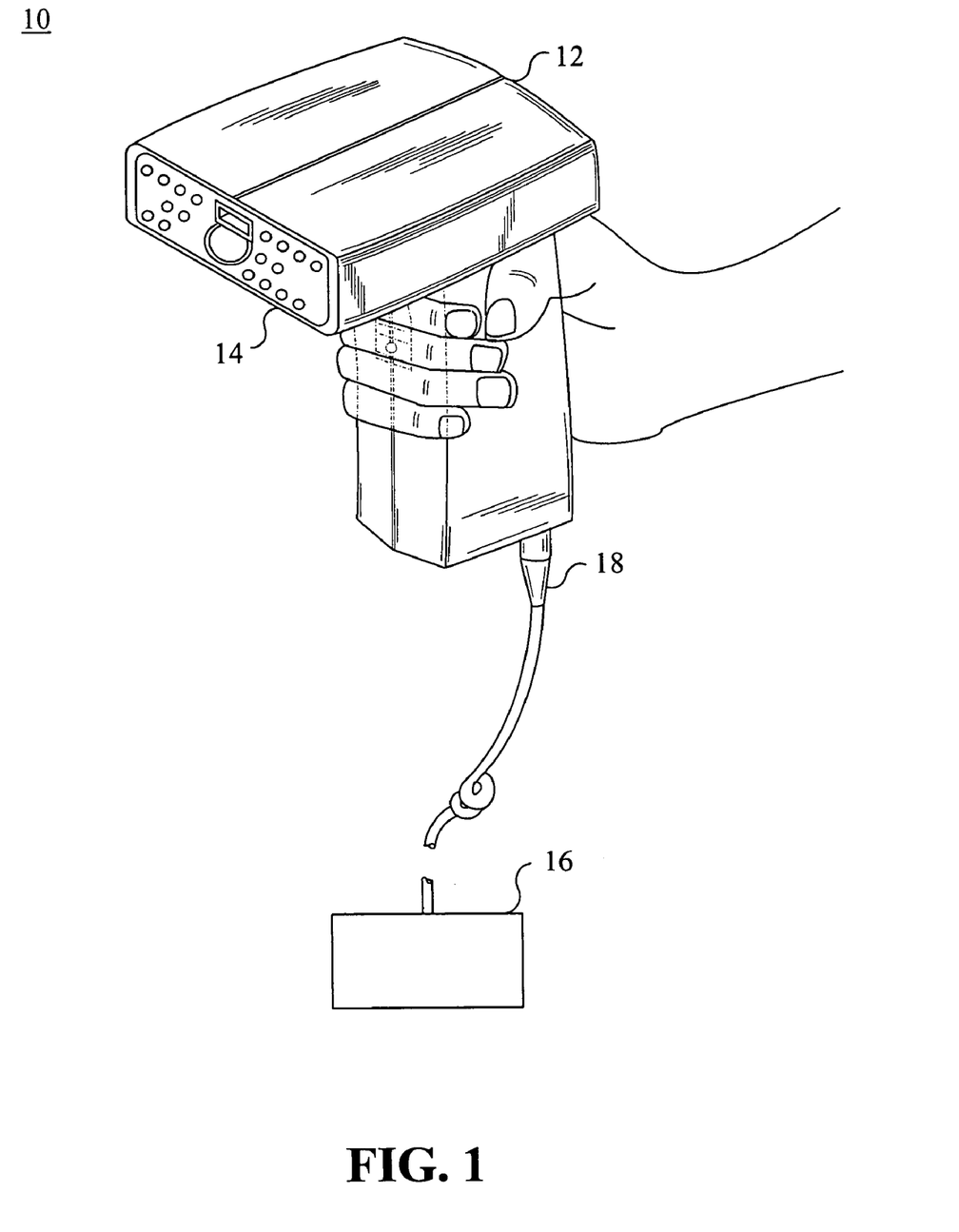
FIG. 1 is a perspective view of an optical code reader system having an optical code reader equipped with an imagine engine having an interface characterized by particular specifications in accordance with one embodiment of the present invention.
Figure 2:
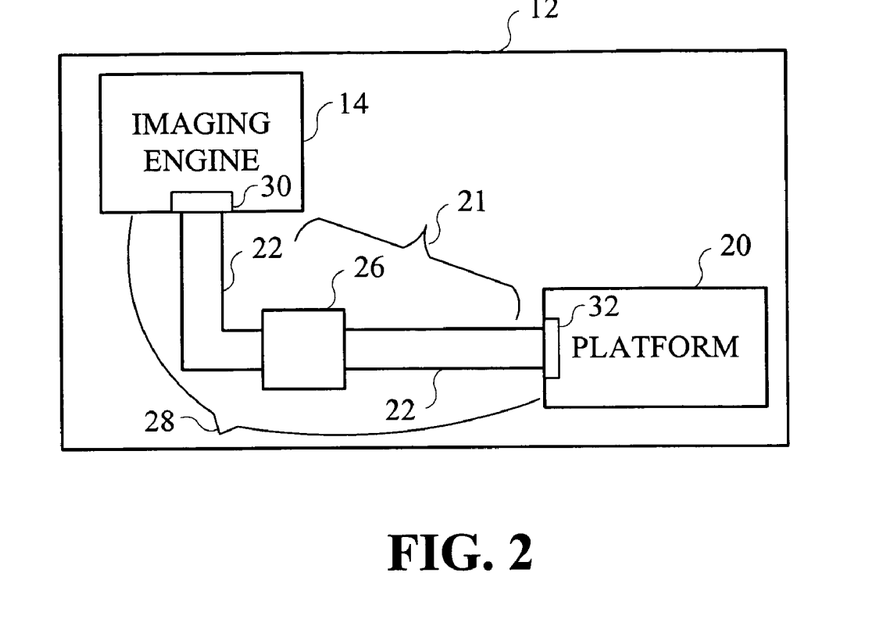
FIG. 2 is a block diagram of the optical code reader depicted in FIG. 1.

FIG. 1 shows an optical code reader system 10 including an optical code reader 12 having an imaging engine 14, where the optical code reader 12 is preferably connected to a host terminal 16 via a cable 18. FIG. 2 shows a block diagram of the optical code reader 12, in which the imaging engine 14 is interfaced to a platform 20. Transmission assembly 21 is provided including at least one connector 22 and/or at least one transmission adaptation device 26 having individually or collectively electrical/and or data transmission circuitry for providing electrical and/or data communication between the imaging engine 14 and the platform 20.

An interface assembly 28, for providing data and/or electrical communication between the imaging engine 14 and the platform 20, includes an input/output (I/O) means 30, such as an I/O port, of the imaging engine 14 configured for exchanging at least one signal with the platform 20, including direct and indirect exchange of the at least one signal; an I/O means 32, such as an I/O port, of platform 20 configured for exchanging the at least one signal with the imaging engine 14, including direct and indirect exchange of the at least one signal; and the transmission assembly 21, directly or indirectly connected between the imaging engine 14 and the platform 20, for transmitting the at least one signal between the imaging engine 14 and the platform 20.

Preferably, the at least one signal includes a plurality of pixel signals corresponding to sensing of an image by the imaging engine 14, at least one focus control signal for controlling focus distance of the imaging engine 14, reference signals for exchanging imaging reference information, synchronization signals, power signals and ground signals. In a preferred embodiment the at least one signal includes a combination of at least one illumination control signal for controlling illumination generated by the imaging engine, at least one aiming signal for controlling aiming by the imaging engine, at least one programmable register signal exchanged 110 with programmable registers in a data signal processor of the imaging engine, at least one chip select signal and at least one frame shift signal.

In another embodiment, the transmission assembly 21 further includes interception circuitry for intercepting a signal of the at least one signal from reaching a destination that it is transmitted toward selected from the group consisting of the imaging engine and the circuitry assembly.

The reader 12 may be a unit integrated into a stationary fixture, such as a checkout counter, a doorway molding, a toll booth, a station on a conveyor belt, etc., or a mobile unit, such as a handheld reader or a rotating turret. Furthermore, the reader 12 may be attached to or integrated with a portable, handheld computer device, such as a PDA and handheld computer devices available from Symbol Technologies, Inc., such as the PDT 6800 Series and the PDT 8100 Series Portable Data Terminals, or attached to or integrated with portable scanning systems or terminals, such as those available from Symbol Technologies, Inc. Such systems may be incorporated as part of a local area, cellular or wide area network to coordinate scanning and other image processing functions described below. Furthermore, the reader 12 may include video control circuitry and frame grabbing circuitry for outputting video signals for displaying images on a terminal monitor. The reader 12 may further include a data compression module (not shown) for compressing image data, such as for storage within the reader 12 and/or host terminal 16. In addition, the imaging engine 14 may be integrated into a video phone system for sharing use of display, processing and I/O capabilities.

In circumstances where the reader 12 is to be retrofitted from a laser line scan engine to an imaging engine 14, the imaging engine 14, and associated circuitry (not shown) can be inserted in place of the line scan engine and circuit board. In this way, previously designed toolings, housings and host devices may be employed and provide continuity in upgrading the code reading system. In preferred embodiments, the imaging engine 14 is less than two cubic inches in volume and is dimensioned to replace a moving laser beam scanning engine in a handheld optical code scanner, such as an SE1200 form factor scanning engine. The reader 12 may further be provided as an optical code reading kit in which more than one imaging engine is provided, and an installed imaging engine is replaceable with a different imaging engine that is better suited for a particular application.

Cable 18 may provide data communication between the reader 12 and the host terminal 16 and/or electric communication for providing electrical power to the reader 12. For example, electrical power may be provided to the reader 12 via the host terminal 16 and cable 18, or alternatively by a rechargeable battery within the reader 12. The cable 18 may be partially or fully replaced by wireless communication means such as radio frequency, optical or cellular communication means. For example, the reader 12 may include a radio frequency board and an antenna which provide a mobile radio link to one or more data terminals, such as the host terminal 16. An infrared data interface (IRDA) or multi-contact shoe may also be provided to communicate data between the reader 12 and an external receiver or docking device, respectively. Compressed tag and/or image data may be transmitted to the host terminal 16 via a radio frequency link, IR communication link, or direct contact with the docking device.

Image data generated by the imaging engine 14 are processed by the reader 12 (as described further below) and/or by the host terminal 16. The host terminal 16 includes or accesses at least one processor, where the at least one processor may be connected to one or more peripherals or computing devices, such as a video monitor, and/or a network. It is contemplated that the reader 12 may operate as a standalone device, without being connected to host terminal 16 or other processor.

The reader 12 is capable of being aimed at an optical code, where the optical code is brought into the field of view of the reader 12 by moving at least one of the optical code and/or the reader 12. Upon actuation, the imaging engine 14 images the optical code within its field of view and generates corresponding image data. A series of optical codes, such as a series of objects on an assembly line each having an affixed code, or a printout of a series of codes, may be provided to the reader 12 for sequential imaging of individual optical codes of the series of optical codes by the reader 12.

Figure 3:
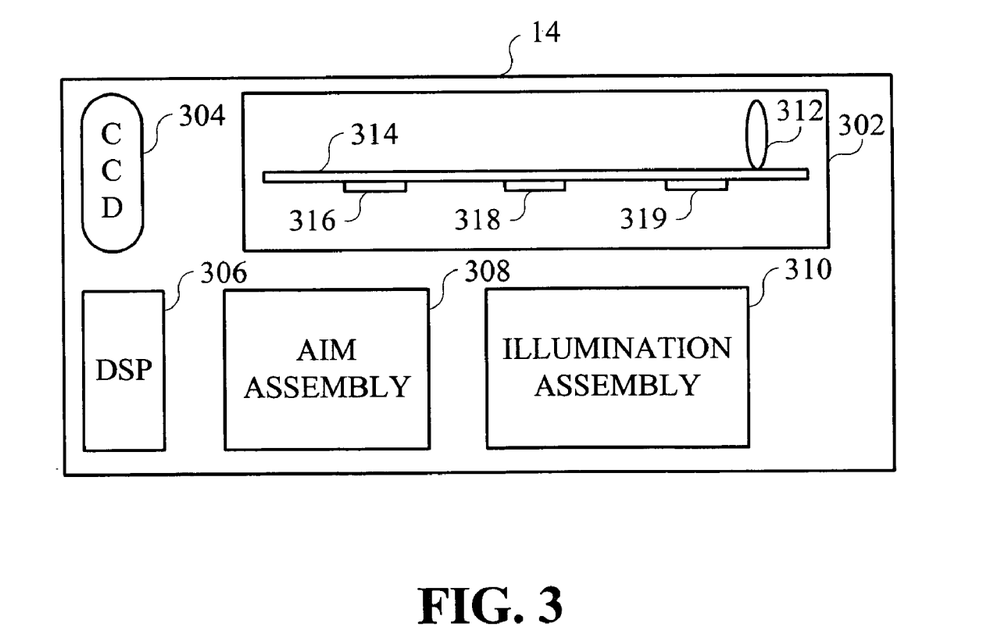
FIG. 3 is a block diagram of the imaging engine depicted by FIG. 1.

The imaging engine 14, as shown in greater detail in FIG. 3, preferably further includes a lens assembly 302; a photo sensor array 304, such as a charge-coupled device (CCD); and a data signal processor (DSP) 306. In a preferred embodiment the imaging engine 14 further includes an aiming system 308 and/or an illumination system 310. Furthermore, in a preferred embodiment, the lens assembly 302 includes at least one lens 312 for focusing light incident on the photo sensor array 304, where positioning of the lens assembly 302 is adjustable for adjusting focus distance of the lens assembly 302. In the example shown, the lens assembly 302 is mounted on a lens guidance assembly 314, and having a lens adjustment mechanism 316 having a motor 318 responsive to a focus control unit 319 for moving at least one lens of the lens assembly 302 along the lens guidance assembly 314 for changing the focus distance of the lens assembly 302. Accordingly, the imaging engine 14 has the ability to change focus positions for extended working range or for better-focused picture taking capability in applications where the user needs to read high-density barcodes and/or take digital pictures.

The DSP 306 includes a data signal processor such as a DSP which includes a multi-chip module (MCM) having at least one charge pump 332 and a timing generator 334 needed to drive the CCD. Preferably, further included within the MCM is a correlated double sampler (not shown) and an A/D converter (not shown) for converting analog voltage output by the CCD into multi-bit (e.g., 8-bit) quantized pixels representing one of a plurality of shades of gray, preferably 256 or more shades of gray.

Preferably, the imaging engine 14 may be configured to operate in a variety of resolution modes, including a high precision mode used for applications in which the reader is used for reading bar codes. Preferably, the high precision mode provides a capability for precise setting of exposure times and faster startup from the power on condition resulting in more aggressive performance.

Platform 20, which may be included within the optical code reader 12 or within the host terminal 16, includes a microprocessor and may further include glue logic, e.g., a customized Application-Specific Integrated Circuit (ASIC), where necessary for interfacing the microprocessor to the transmission assembly 21. The microprocessor is preferably a commercially available microprocessor. In one embodiment, the platform includes a microprocessor configured in accordance with XSCALE architecture, e.g., an Intel PXA250 processor, and a customized Application-Specific Integrated Circuit (ASIC). In another embodiment, the platform includes a microprocessor that potentially does not need glue logic for connecting to the transmission assembly 21, e.g., a Motorola MX-1 processor.

The at least one connector 22 is preferably a commercially available electrical connector for coupling two devices for electrical and/or data communication. The at least one connector 22 may be elongated, such as including cables, such as flat flexible cables, for connecting the two devices when they are located a distance from one another. In the example provided, the at least one connector 22 includes a 31 position, 0.3 mm flex connector manufactured by Molex Inc. It is envisioned that the at least one connector 22 is a connector for non-electrical transmissions, such as optical transmissions.

The at least one transmission adaptation device 26 is a device, such as an adaptor, for adapting an electrical and/or data transmission. The at least one transmission adaptation device 26 may adapt the transmission such as by modifying transmission of one or more signals of the at least one signal, including modifying a characteristic of the at least one signal and/or the path traveled by the signal. For example, the at least one transmission adaptation device 26 may modify a characteristic, such as by combining one or more signals of the at least one signal into one signal, generating one or more signals from one signal of the at least one signal, and/or changing the configuration of the signal, such as performing a conversion on the signal, for example between electrical, optical, RF, etc. For another example, the at least one transmission adaptation device 26 may modify a path, such as by directing a signal of the at least one signal from a contact, such as a pin, of one connector or input/output means to a contact, such as a pin, of another connector or input/output means. Alternatively, the transmission adaptation device 26 may terminate a path along which the at least one signal is propagated. It is envisioned that the at least one connector 22 and/or the at least one transmission adaptation device 26 include a combination of wired and wireless data transmission means, including means for converting the transmission between wired and wireless transmission modes, such as optical, RF, etc.

Figure 4:
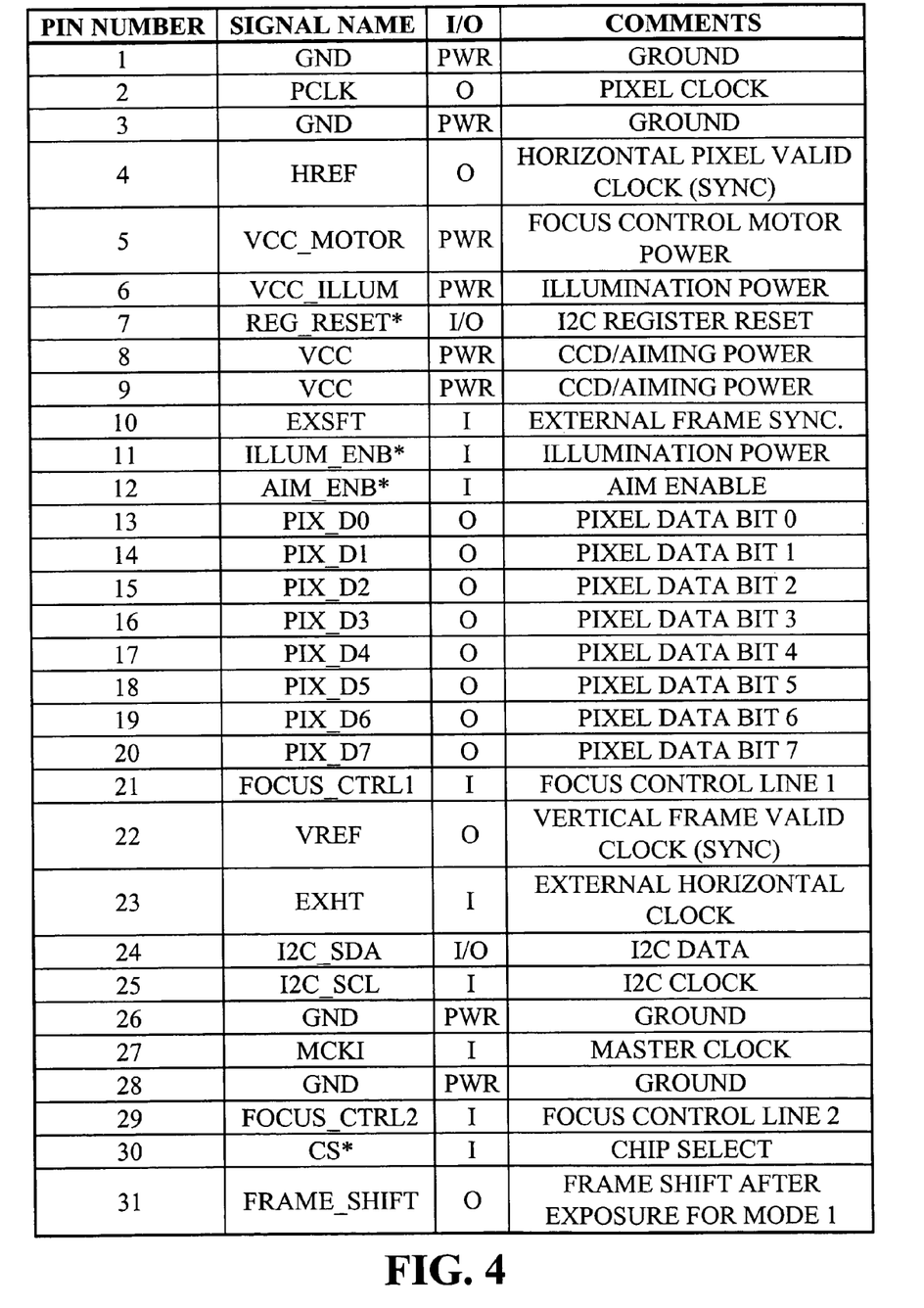
FIG. 4 is a table of an exemplary configuration for pin connections of a data signal processor of the imaging engine.

FIG. 4 shows an exemplary configuration for pin connections of the DSP 306 provided at I/O means 30 for connecting to platform 20 via transmission assembly 21, preferably when the imaging engine 14 is configured to operate in the high precision resolution mode. It is contemplated that different configurations for pin connections may be used when the imaging engine 14 is configured to operate in other resolution modes.

Preferably, the location L1 for pin one P1 of the DSP 306 is positioned on a side S1 of the imaging engine 14 opposite the aiming and illumination assemblies 308, 310, respectively. Preferably, the operating voltage provided is between 3.10v and 3.45v. It is contemplated that the signals listed in FIG. 4 be respectively assigned to different pins. Preferably, the VCC line is filtered, such as via LC filtering, to minimize digital noise from the terminal from getting into the camera analog chain. Preferably, the FRAME_SHIFT pin is left unconnected, as it is for use in future systems configured to operate in a resolution mode other than the high precision resolution mode. However, when operating in the resolution mode in which the I/O is available and FRAME_SHIFT is connected, it is preferable to connect the FRAME_SHIFT pin to an input of the platform 20. The FRAME_SHIFT pin is preferably connected to the UV6 pin of the LC99704 DSP which corresponds to address 216*d* bit 6.

The REG_RESET* pin resets I²C registers in the LC99704 DSP when it is made low, and therefore it is preferable that circuitry be included in the imaging engine 14 to ensure that the REG_RESET* pin gets a valid reset at power up. The REG_RESET* pin may be connected to an open drain output of the platform 20 so that the I²C registers can be software reset via a hardware line. In an embodiment in which a customized ASIC is included in the platform 20, CS* pin is connected to ground, since when the CS* pin is driven high, pixel data bits become high-Z, which is not needed in applications using the customized ASIC implementation. The FOCUS_CTRL1 and FOCUS_CTRL2 pins are used to enable various modes of focus selection, where enablement of the modes for focus selection does not require real-time modification of signals at the FOCUS_CTRL1 and FOCUS_CTRL2 pins during image acquisition. Accordingly, it is preferable to connect the FOCUS_CTRL1 and FOCUS_CTRL2 pins to a general purpose input/output pin or port of the platform 20 for modification of focus selection on a scan session basis.

Figure 5:
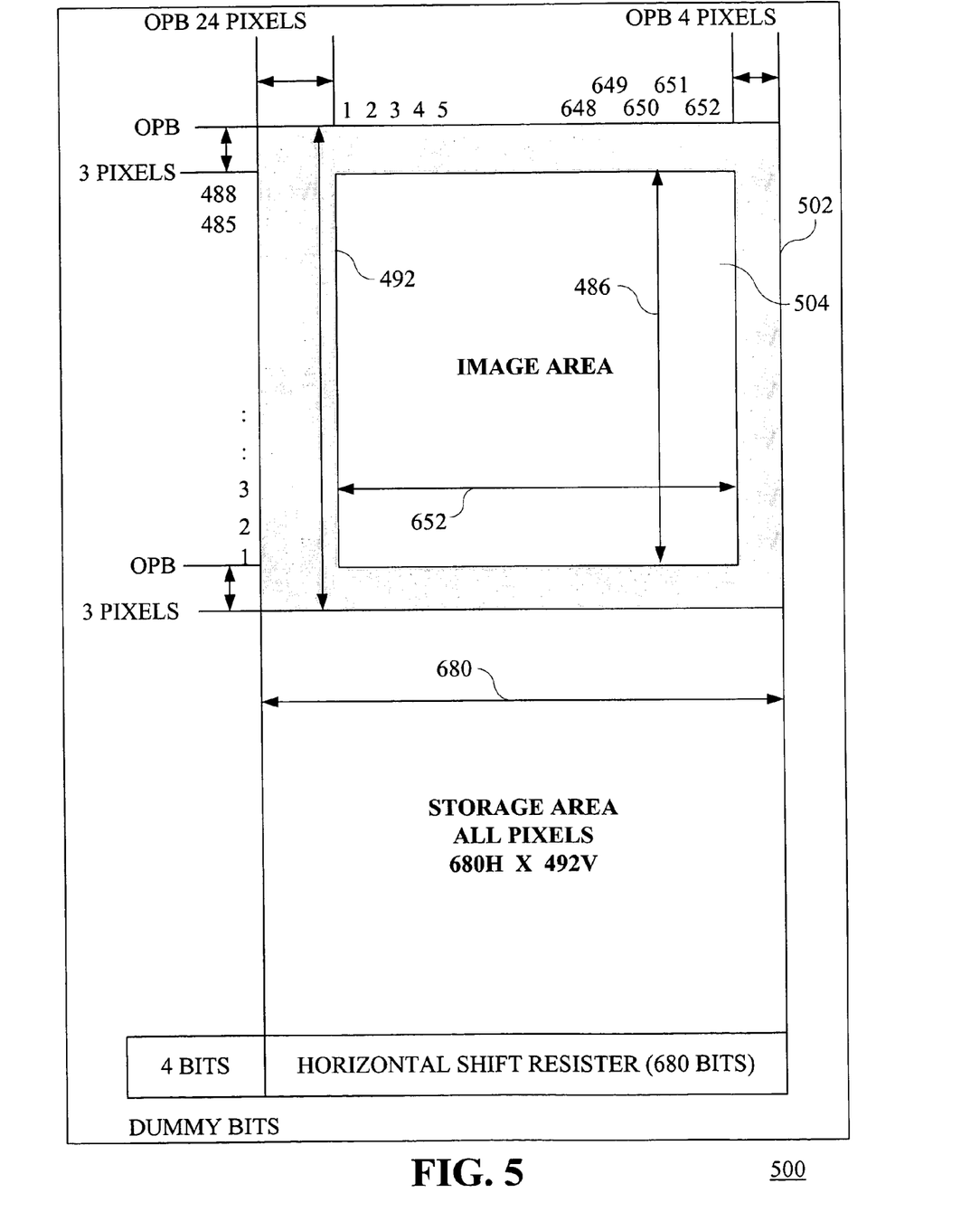
FIG. 5 is pixel layout 400 for a photo sensor array of the imaging engine depicted in FIG. 3.

FIG. 5 shows pixel layout 500 for the exemplary LC00214 CCD. The pixel area 502 is composed of 680 horizontal pixels and 492 vertical pixels. The actual or effective pixels upon which light is gathered is a slightly smaller image area 504 of 652H by 486V pixels, where optically black pixels (OPBs) are pixels that are not photo-sensitive. When the photo sensor array 304 is read-out during image capture all of the pixels are captured unless the image cropping features of the DSP 306 are configured through the I²C interface.

Preferably, a clock supplied by the platform has a nominal frequency of 47.923 MHz. The platform 20 divides down this clock to generate a master clock input (MCKI) to the imaging engine 14. Preferably, the exemplary platform clock of 47.923 MHz is divided down by four to 11.981 MHz for generating the MCKI. The exemplary LC00214 CCD needs a clock near 24 MHz to operate properly. Accordingly, an internal PLL of the DSP 306 is used to multiply the incoming MCKI by two to obtain an internal camera (i.e., imaging engine) clock of 23.962 MHz, known as the camera's master clock (MCK). During read out of the pixel area, each pixel is converted to an 8-bit digital value in the current example at a rate equal to one half the MCK. So preferably a pixel clock, PCLK, has a frequency of $$\frac{23.962 \text{ MHz}}{2} = 11.981 \text{ MHz}.$$

In a preferred embodiment the camera is configured such that there are 763 PCLK periods per line of pixels read out, this means that the total time to read one line out from the photo sensor array 304, otherwise known as the horizontal period, is $$= \frac{763}{11.981 \text{ MHz}} = 63.69 \text{ μs}$$

(a HREF/EXHT period), where HREF refers to a horizontal reference signal, and EXHT refers to an external horizontal trigger signal. Furthermore, in the preferred embodiment there are 525 line periods in an entire frame (image), which means that the total time to read out a full frame from the photo sensor array 304, otherwise know as the vertical period, is =525×63.69 μs=33.43 ms. (an VREF/EXSFT period), where VREF refers to a vertical reference signal, and EXSFT refers to an external start of frame trigger signal. This yields a constant frame rate of $$\frac{1}{33.43 \text{ ms}} = 29.91$$

frames per second. Both the platform 20 and the DSP 306 need to be configured properly to obtain congruent clock settings, and preferably, appropriate default register settings are provided for ensuring that the LC99704 DSP 306 is configured properly.

Preferably, a power mode of a plurality of power modes (modes of power consumption) may be selected for the imaging engine 14, depending upon the state of the decoding application. Each of these power modes offers a trade-off between power consumption and time to acquire an image, which ultimately impacts time to decode. Five exemplary operating power modes are:

A. Completely powered off by a hardware switch;
B. Host acquisition halted, camera placed in standby via I²C settings;
C. Host acquisition halted, external camera sync signals halted (EXSFT & EXHT idle);
D. Host acquisition halted, camera run at full frame rate; and
E. Acquiring and running at full frame rate.

The charge pump 332, which generates a voltage, such as +/−5v, so that charge can be properly shifted out of the CCD sensor, takes time to come up to regulation. When in power modes A and B, the charge pump circuit is brought up to regulation as fast as possible (~60 ms) (the charge pump is already up to regulation in the remaining power modes). A startup sequence is preferably implemented to minimize this time.

In power mode A, the engine is completely powered off and must go through a power-on sequence which includes:

1. Programming the camera register settings via I²C; and
2. Idling EXSFT to prime the charge pump.

The idling of EXSFT helps to get the charge pump voltage to regulation as fast as possible and is preferably performed by setting an image control sensor size (ICSS) register of the platform 20 appropriately.

Figure 6:
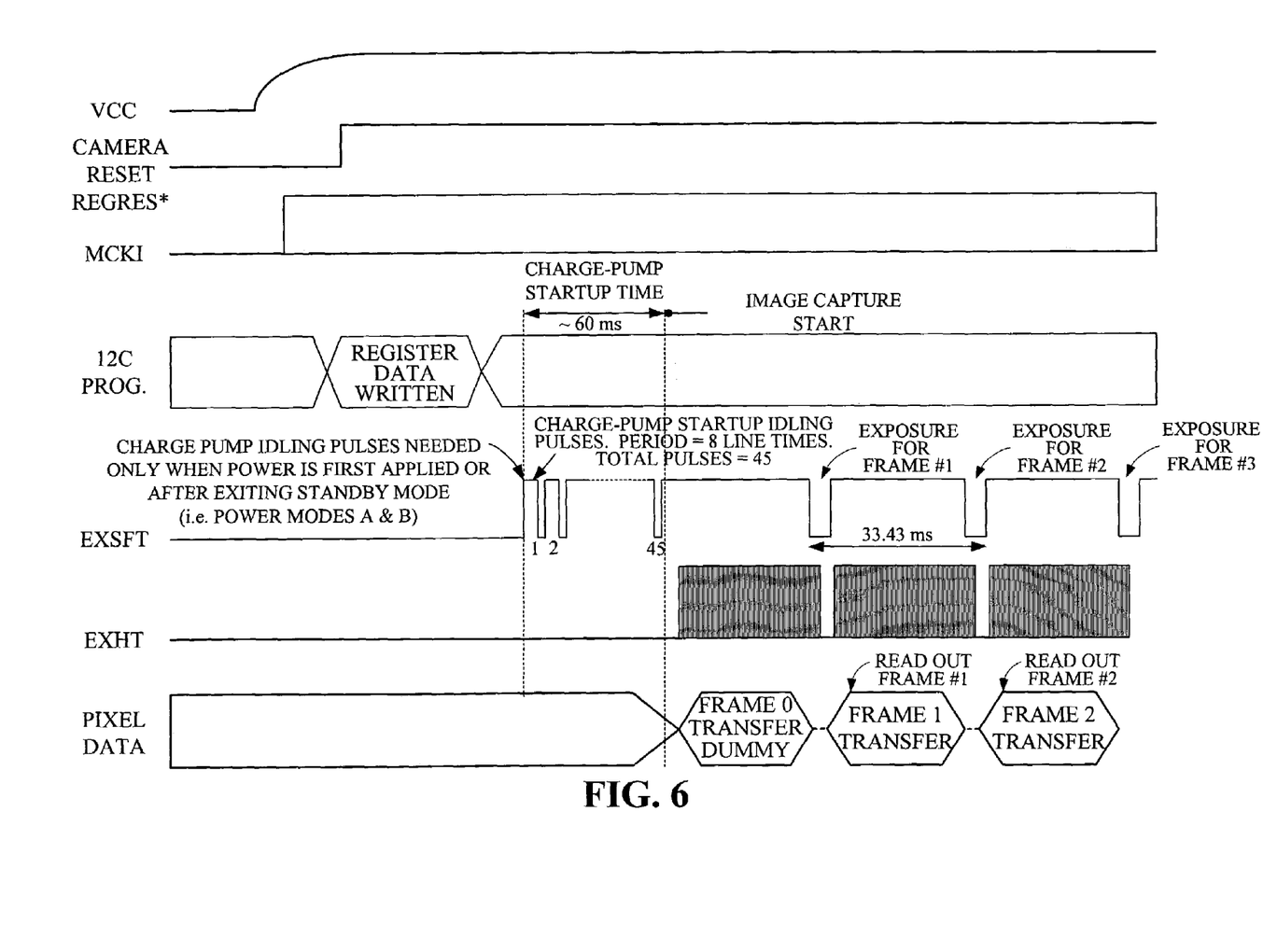
FIG. 6 is a timing diagram of a startup sequence of a data signal processor of the imaging engine depicted in FIG. 3.

FIG. 6 depicts the timing of the startup sequence of the imaging engine 14 after power is applied to the imaging engine 14 or after exiting the imaging engine's standby power mode B. The I²C registers are written to in accordance with design requirements after power is applied.

An I²C register writing sequence is performed when entering power mode B (standby) in accordance with design requirements. When exiting power mode B (standby), full programming of the I²C registers is preferably not performed, since the register contents are not lost by going into standby power mode B. To exit standby power mode B the following sequence is preferably followed:

1. Exit standby power mode B via I²C register writing;
2. Idling of EXSFT to prime charge pump; and
3. Initialization of the motor focus control.

When exiting standby power mode B an I²C register writing sequence is performed in accordance with design requirements. Once standby power mode B is exited, the charge pump startup sequence shown in FIG. 6 is preferably followed.

Preferably, the lens guidance assembly 314 of the imaging engine 14 is capable of being set to one of two different predetermined focus positions that are set at the time of manufacture. One focus position, called the near focus, allows the imaging engine 14 to focus on objects that are about five inches (12.7 cm) away. The second focus position, called the far focus, allows the imaging engine 14 to focus on objects that are about nine inches (22.9 cm) away. The superset of these two focus positions provides the imaging engine 14 with the capability to achieve excellent working range across a range of bar code densities, and further provides for improved distance picture taking capability when set to the far focus position. The focus control unit 319 is controlled by the FOCUS_CTRL1 and FOCUS_CNTRL2 signals for controlling operation of the motor 318 for positioning the lens assembly 302. Control of positioning the lens assembly 302 is shown in Table 1.

TABLE I

Focus control definitions

| FOCUS_CTRL1 | FOCUS_CTRL2 | Operation | Comments |
|---|---|---|---|
| 0 | 0 | Motor 318 completely OFF | Motor 318 not operated and lens assembly 302 not held in either position. |
| 0 | 1 | Far Focus Position Selected | Motor 318 operated to force lens assembly 302 into far position |
| 1 | 0 | Near Focus Position Selected | Motor 318 operated to force lens assembly 302 into near position |
| 1 | 1 | Toggle Mode | Motor 318 operated to change lens assembly position between near and far positions on each rising edge of EXSFT. |

Typically the motor 318 will be run in toggle mode during barcode decode scan sessions so that the focus changes between near and far focus with each acquired frame. In certain situations, such as picture taking and specific barcode reading applications, it may be desirable to force one of the focus positions over multiple frame captures. Once commanded to operate, the motor 318 will operate the lens adjustment mechanism 216 for moving the at least one lens 312 along the lens guidance assembly 314 to the designated position and settling there within 20 ms of time. This means that the maximum exposure time is roughly a frame time minus the 20 ms settle time, resulting in a maximum exposure setting of 12 ms. The software should not set the exposure time to be larger than 12 ms when operating in toggle mode to ensure proper and stable image capture. If a focus position is forced to near or far, the exposure time can be made as large as a frame time without issue as long as the motor is given 20 ms to settle from the time the focus position is forced to the time the first image exposure begins.

There may be a need under certain conditions to know the focus position of a captured image when toggle mode is enabled. In the example provided there is no direct feedback from the imaging engine 14 as to the focus position that the lens assembly 302 is in while an image is being read out. The only way to know the focus position is to initialize the imaging engine 14 to a particular focus position and then keep track of the current focus position on a frame-by-frame basis. One way to accomplish this task is to force the focus position to a particular focus position using FOCUS_CTRL1 and FOCUS_CTRL2, then change the focus control to toggle mode, and command the platform 20 to enable the EXSFT signal (e.g., in the platform, setting a RUN bit (assuming the ACQ bit is already enabled)). On every rising edge of EXSFT the camera focus will toggle, so the first frame will be captured in the focus position opposite to the initialized position. The next frame will be at the initialized position and so on. As each of these frames are captured an end of frame interrupt is generated by the platform 20, and the frame can be tagged with its focus position while the current focus position is toggled to the next position in preparation for capturing the next frame. Preferably, when using any of power modes A–E, an initial focus position is set to ensure that the first frame always starts in a predetermined focus position.

Operating the platform 20 in power mode D, in which running is enabled for enabling the imaging engine 14 to sense images, but acquiring of images is disabled (in the platform 20, a RUN bit (run) is enabled and an ACQ bit (acquire) is disabled), may be used, for example, in the middle of a scan session when two frames have been acquired and are being processed and the system continues to let the camera run without acquisition so that it can aggressively capture more frames if needed. In this situation, the processor will not generate an end of frame interrupt since it is not acquiring. Under this condition keeping track of the focus position state becomes more difficult. It is recommended that if power mode D is used, the motor should be forced to an initialized focus position until the acquiring (the ACQ bit) is enabled. This will guarantee that the focus control is re-initialized to a known starting position, and the end of frame interrupt can again be used to keep track of the focus position state. Default camera register settings to be written to DSP 306 of the imaging engine 14 (e.g., the LC99704) after power up are provided in accordance with design requirements.

Figure 7:
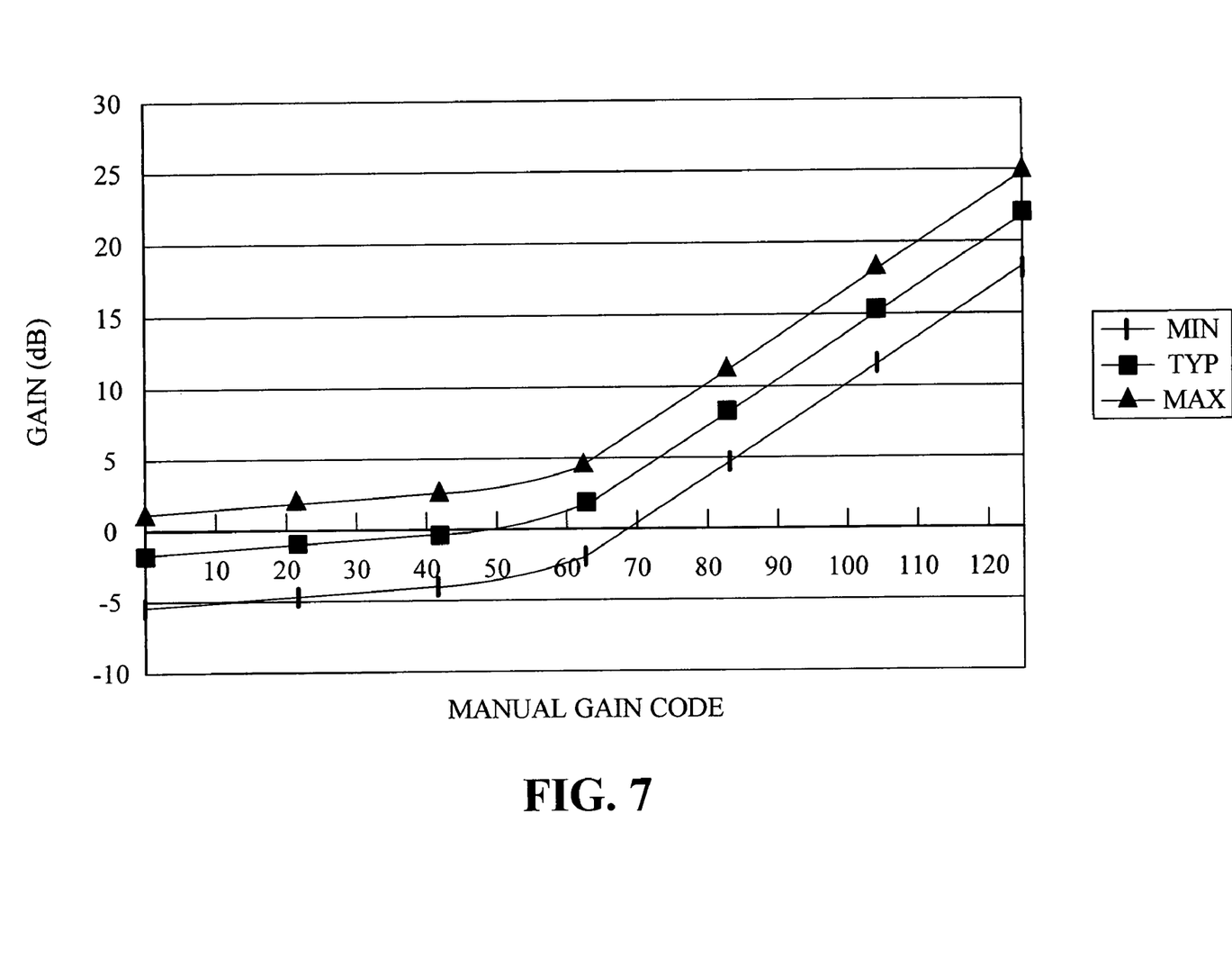
FIG. 7 is a plot of analog gain achieved in response to digital gain control entered via the data signal processor in accordance with the present invention.

Preferably, the imaging engine 14 includes both a digital and analog gain control that is capable of being manually varied over the I²C interface. Barcode reading applications typically do not make use of the digital gain control since it does not generally provide true signal amplification value. The analog gain is controlled via register 157d of the LC99704 DSP. FIG. 7 shows analog gains achieved in accordance with digital values written to register 157d. The analog gain takes effect on the subsequent frame read out.

The acquisition interface for the platform 20 is preferably highly programmable. Key items that need to be configured to ensure proper camera operation are: the setting of MCKI to be congruent with DSP 306 (11.981 MHz from the platform 20 in the example provided); polarity of EXSFT to match a startup sequence of the imaging engine 14 after power is applied to the imaging engine 14 or after exiting the imaging engine's standby power mode B; the idle states of EXHT and EXSFT when acquisition/running are disabled; pixels per line and lines per frame are congruent with the CCD; and direct memory access (DMA) destination and reload address registers.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claim is:

1. An interface assembly for interfacing an imaging engine removably positioned within an optical code reader and having an adjustable lens assembly to a circuitry assembly of an optical code reader system, the interface assembly comprising:

a first coupling circuitry assembly for transmission of at least one input signal including in a first direction from the circuitry assembly toward the imaging engine, the at least one input signal including at least one focus control signal for controlling the lens assembly for selecting a focus position of at least two focus positions, a focus control motor power signal, an illumination power signal, a combined CCD/aiming power signal, an illumination enable signal for controlling an illumination assembly of the imaging engine and an aim enable signal for controlling an aiming assembly of the imaging engine, wherein the at least one focus control signal includes two signals for selecting a focus control mode from at least three focus control modes, and wherein the at least three focus control modes are selected from the group of focus control modes consisting of a first mode for operating a motor of the lens assembly for selecting a first focus distance, operating the motor for selecting a second focus distance, not operating the motor and not selecting a focus distance, and operating the motor to switch between the first and second focus distances for image acquisition of a series of at least two image acquisitions; and a second coupling circuitry assembly for transmission of at least one output signal in a second direction from the imaging engine toward the circuitry assembly, the at least one output signal including at least one pixel data signal, wherein the at least one pixel data signal is indicative of light sensed by a photo sensor array of the imaging engine.

2. The interface assembly according to claim 1, further comprising a third coupling circuitry assembly for bi-directional transmission of at least one signal of the at least one signal between the circuitry assembly and the imaging engine.

3. The interface assembly according to claim 1, wherein the at least one input signal further includes at least one register data signal for programming data into at least one register in a data signal processor of the imaging engine and at least one register clock signal.

4. The interface assembly according to claim 1, wherein the at least one input signal further includes including at least one external frame synchronization signal, at least one external horizontal clock signal, at least one register reset signal for resetting the at least one register, at least one chip select signal for selecting a chip of at least one chip of the data signal processor, and at least one master clock signal.

5. The interface assembly according to claim 1, wherein the at least one output signal further includes at least one pixel clock signal, at least one horizontal pixel valid clock synchronization signal- and at least one vertical frame valid clock synchronization signal.

6. The interface assembly according to claim 1, wherein the at least one output signal further includes a frame shift after exposure for a predetermined mode signal.

7. The interface assembly according to claim 1, wherein the first and second coupling circuitry assemblies are included in at least one of an input/output (I/O) means of the imaging engine, an I/O means of the circuit assembly, and a transmission assembly connected between the imaging engine and the circuitry assembly.

8. The interface assembly according to claim 7, wherein the transmission assembly includes at least one connector providing a path for at least one of electrical and data communication, and at least one transmission adaptation device for modifying at least one of a path and a property of the at least one signal.

9. The interface assembly according to claim 1, wherein the first and second coupling circuitry assemblies are connected directly to at least one of the imaging engine and the circuitry assembly.

10. The interface assembly according to claim 1, wherein the first, second and third coupling circuitry assemblies in combination include a connector having at least first and second ends, one of the of the first and second ends including a plurality of contacts including a first through a thirty-first contact.

11. The interface assembly according to claim 10, wherein contacts of the first through thirty-first contacts have a pitch of 0.3 mm.

12. A method for interfacing an imaging engine removably positioned within an optical code reader to a circuitry assembly of an optical code reader system, the method comprising the steps of:

transmitting in a first direction from the circuitry assembly toward the imaging engine at least one focus control signal for controlling a lens assembly of the imaging engine for selecting a focus position of at least two focus positions, a focus control motor power signal, an illumination power signal, a combined CCD/aiming power signal, an illumination enable signal for controlling an illumination assembly of the imaging engine and an aim enable signal for controlling an aiming assembly of the imaging engine, wherein transmitting the at least one focus control signal includes transmitting two signals for selecting a focus control mode from at least three focus control modes, and wherein the at least three focus control modes are selected from the group of focus control modes consisting of a first mode for operating a motor of the lens assembly for selecting a first focus distance, operating the motor for selecting a second focus distance, not operating the motor and not selecting a focus distance, and operating the motor to switch between the first and second focus distances for image acquisition of a series of at least two image acquisitions; and transmitting at least one pixel data signal indicative of light sensed by a photo sensor array of the imaging engine in a second direction from the imaging engine toward the circuitry assembly.

13. The method according to claim 12, further comprising the step of transmitting in the first direction at least one register data signal for programming data into at least one register in a data signal processor of the imaging engine and at least one register clock signal.

14. The method according to claim 13, further comprising the step of transmitting in the first direction at least one external frame signal, at least one external horizontal clock signal, at least one register reset signal for resetting the at least one register, at least one chip select signal for selecting a chip of at least one chip of the data signal processor, and at least one master clock signal.

15. The method according to claim 12, further comprising the step of transmitting in the second direction at least one pixel clock signal, at least one horizontal pixel valid clock synchronization signal, and at least one vertical frame valid clock signal.

16. An interface assembly for interfacing an imaging engine having an adjustable lens assembly to a circuitry assembly of an optical code reader system, the interface assembly comprising:

coupling circuitry comprising:

first coupling circuitry for transmitting at least one master clock signal in a first direction from the circuitry assembly toward the imaging engine;

second coupling circuitry for transmitting at least one horizontal pixel valid synchronization clock signal in a second direction from the imaging engine toward the circuitry assembly;

third coupling circuitry for transmitting in the second direction at least one vertical frame valid synchronization clock signal;

fourth coupling circuitry for transmitting in the second direction a plurality of bits of pixel data indicative of light sensed by a photo sensor array of the imaging engine; and fifth coupling circuitry for transmitting in the first direction at least one focus control signal for controlling the lens assembly for selecting a focus position.

17. The interface assembly according to claim 16, wherein the coupling circuitry is connected directly to at least one of the imaging engine and the circuitry assembly.

18. The interface assembly according to claim 16, wherein the coupling circuitry further comprises interception circuitry for intercepting a signal of the at least one signal from reaching a destination that the signal is transmitted toward selected from the group consisting of the imaging engine and the circuitry assembly.

19. The interface assembly according to claim 16, the coupling circuitry further comprising:

sixth coupling circuitry for transmitting at least one focus control motor power signal in the first direction for providing power to a motor capable of adjusting the lens assembly of the imaging engine for changing a focus position of the imaging engine;

seventh coupling circuitry for transmitting at least one ground signal in a first direction from the circuitry assembly to the imaging engine;

eighth coupling circuitry for transmitting in the first direction at least one illumination enable signal for controlling an illumination assembly of the imaging engine;

ninth coupling circuitry for transmitting in the first direction at least one aim enable signal for controlling an aiming assembly of the imaging engine;

tenth coupling circuitry for transmitting in the first direction at least one illumination power signal for providing power to the illumination assembly; and eleventh coupling circuitry for transmitting in the first direction at least one aiming power signal for providing power to an aiming assembly of the optical code reader system.

20. The interface assembly according to claim 19, the coupling circuitry further comprising:
twelfth coupling circuitry for transmitting in the second direction at least one pixel clock signal;
thirteenth coupling circuitry for transmitting in the first direction at least one external horizontal clock signal;
fourteenth coupling circuitry for transmitting at least one I²C register data signal in at least one of the first and second directions;
fifteenth coupling circuitry for transmitting in the first direction at least one I²C register clock signal;
sixteenth coupling circuitry for transmitting at least one register reset signal in at least one of the first and second directions for resetting at least one register of a data signal processor of the imaging engine;
seventeenth coupling circuitry for transmitting in the first direction at least one chip select signal;
eighteenth coupling circuitry for transmitting in the second direction at least one frame shift after exposure signal; and
nineteenth coupling circuitry for transmitting in the first direction at least one external frame synchronization signal.

21. The interface assembly according to claim 20, wherein the interface assembly further comprises a connector having at least first and second ends, one of the of the first and second ends including a plurality of contacts including a first through a thirty-first contact, wherein the first coupling circuitry includes one contact of the plurality of contacts, the second coupling circuitry includes one contact of the plurality of contacts, the third coupling circuitry includes one contact of the plurality of contacts, the fourth coupling circuitry includes eight contacts of the plurality of contacts, the fifth coupling circuitry includes two contacts of the plurality of contacts, the sixth coupling circuitry includes one contact of the plurality of contacts, the seventh coupling circuitry includes four contacts of the plurality of contacts, the eighth coupling circuitry includes one contact of the plurality of contacts, the ninth coupling circuitry includes one contact of the plurality of contacts, the tenth coupling circuitry includes one contact of the plurality of contacts, the eleventh coupling circuitry includes two contacts of the plurality of contacts, the twelfth coupling circuitry includes one contact of the plurality of contacts, the thirteenth coupling circuitry includes one contact of the plurality of contacts, the fourteenth coupling circuitry includes one contact of the plurality of contacts, the fifteenth coupling circuitry includes one contact of the plurality of contacts, the sixteenth coupling circuitry includes one contact of the plurality of contacts, the seventeenth coupling circuitry includes one of the plurality of contacts, the eighteenth coupling circuitry includes one contact of the plurality of contacts, and the nineteenth coupling circuitry includes one contact of the plurality of contacts, wherein each of the contacts included by the first through the nineteenth coupling circuitries are different contacts.

22. An interface assembly for interfacing an imaging engine having an adjustable lens assembly to a circuitry assembly of an optical code reader system, the interface assembly comprising:
a connector having at least a first and second end, one of the of the first and second ends including a plurality of contacts including a first through a thirty-first contact for transmitting at least one signal;
first coupling circuitry for transmitting at least one focus control signal and at least one focus and motor power in a first direction from the circuitry assembly toward the imaging engine for controlling the lens assembly for selecting a focus position of at least two focus positions of the lens assembly, the first coupling circuitry including four contacts of the plurality of contacts;
second coupling circuitry for transmitting at least one of at least one illumination enable signal in the first direction for controlling an illumination assembly of the optical code reader system and at least one aim enable signal in the first direction for controlling an aiming assembly of the optical code reader system, the second coupling including at least two of the contacts of the plurality of contacts; and
third coupling circuitry for transmitting a plurality of bits of pixel data indicative of light sensed by a photo sensor array of the imaging engine in a second direction from the imaging engine toward the circuitry assembly, the third coupling circuitry including eight contacts of the plurality of contacts;
wherein each of the contacts included in the first through the third coupling circuitry are different contacts.

23. The interface assembly according to claim 22, wherein at least one of the first, second and third coupling circuitries is connected directly to at least one of the imaging engine and the circuitry assembly.

24. An interface assembly for interfacing an imaging engine having an adjustable lens assembly to a circuitry assembly of an optical code reader system, the interface assembly comprising:
at least one of an input/output (I/O) means of the imaging engine, an I/O means of the circuit assembly, and a transmission assembly connected between the imaging engine and the circuitry assembly configured for transmitting at least one signal from one of the imaging engine and the circuitry assembly toward the other of the imaging engine and the circuitry assembly; wherein the at least one signal includes at least one pixel data signal indicative of light sensed by a photo sensor array of the imaging engine; at least one clock signal for synchronization of the imaging engine and circuitry assembly; a focus control motor power signal; an illumination power signal; a combined CCD/aiming power signal; an illumination enable signal for controlling an illumination assembly of the imaging engine; an aim enable signal for controlling an aiming assembly of the imaging engine; at least one focus control signal for controlling adjustment of the lens assembly including selecting a focus control mode from at least three focus control modes; and at least one ground signal, wherein the transmission assembly includes a connector having a plurality of contacts, two contacts of the plurality of contacts transmit the at least one focus control signal, two contacts of the plurality of contacts transmit the CCD/aiming power signal, and one contact of the plurality of contacts transmits each of the focus control motor power signal, illumination power signal, illumination enable signal and aim enable signal, respectively.

25. The interface assembly according to claim 24, wherein the transmission assembly includes at least one of at least one connector providing a path for at least one of electrical and data communication, and at least one transmission adaptation device for modifying at least one of a path and a property of the at least one signal.

26. The interface assembly according to claim 24, wherein the transmission assembly includes interception circuitry for intercepting a signal of the at least one signal from reaching a destination that the signal is transmitted toward selected from the group consisting of the imaging engine and the circuitry assembly.

27. The interface assembly according to claim 24, further comprising at least one of means for wired transmission and means for wireless transmission for transmitting the at least one signal.

28. The interface assembly according to claim 24, wherein the transmission assembly includes a connector having thirty-one contacts.

29. The interface assembly according to claim 28, wherein contacts of the thirty-one contacts have a pitch of 0.3 mm.

* * * * *